United States Patent
Droux et al.

(10) Patent No.: US 7,499,457 B1
(45) Date of Patent: *Mar. 3, 2009

(54) METHOD AND APPARATUS FOR ENFORCING PACKET DESTINATION SPECIFIC PRIORITY USING THREADS

(75) Inventors: Nicolas G. Droux, San Jose, CA (US); Sunay Tripathi, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 606 days.

This patent is subject to a terminal disclaimer.

(21) Appl. No.: 11/112,584

(22) Filed: Apr. 22, 2005

(51) Int. Cl.
*H04L 12/28* (2006.01)
(52) U.S. Cl. .................... 370/395.7; 370/412
(58) Field of Classification Search ............... 370/422, 370/389, 338, 400, 412–418, 396, 347, 395.53, 370/401, 403, 404, 405, 406, 409, 395.7, 370/399
See application file for complete search history.

(56) References Cited

U.S. PATENT DOCUMENTS

| | | | |
|---|---|---|---|
| 6,041,053 A | | 3/2000 | Douceur et al. |
| 6,070,219 A | * | 5/2000 | McAlpine et al. ........... 710/263 |
| 6,163,539 A | | 12/2000 | Alexander et al. |
| 6,477,643 B1 | * | 11/2002 | Vorbach et al. ............. 713/100 |
| 6,600,721 B2 | | 7/2003 | Edholm |
| 6,714,960 B1 | * | 3/2004 | Bitar et al. .................. 718/103 |
| 6,757,731 B1 | | 6/2004 | Barnes et al. |
| 6,831,893 B1 | | 12/2004 | Ben Nun et al. |
| 6,859,841 B2 | | 2/2005 | Narad et al. |
| 6,944,168 B2 | | 9/2005 | Paatela et al. |
| 7,046,665 B1 | | 5/2006 | Walrand et al. |
| 7,177,311 B1 | | 2/2007 | Hussain et al. |
| 7,260,102 B2 | | 8/2007 | Mehrvar et al. |
| 7,313,142 B2 | | 12/2007 | Matsuo et al. |
| 2003/0037154 A1 | | 2/2003 | Poggio et al. |
| 2005/0135243 A1 | | 6/2005 | Lee et al. |
| 2005/0138620 A1 | | 6/2005 | Lewites |
| 2006/0041667 A1 | | 2/2006 | Ahn et al. |
| 2006/0070066 A1 | | 3/2006 | Grobman |
| 2006/0174324 A1 | | 8/2006 | Zur et al. |

OTHER PUBLICATIONS

Dovrolis, C., Thayer, B. and Ramanathan P.: "HIP: Hybrid: Hybrid Interrupt—Polling for the Network Interface", ACM SIGOPS Operating Systems Review, vol. 35, Iss. 44, Oct. 2001, 11 pages.

* cited by examiner

*Primary Examiner*—Chirag G Shah
*Assistant Examiner*—Nima Mahmoudzadeh
(74) *Attorney, Agent, or Firm*—Osha • Liang LLP

(57) ABSTRACT

A method for processing a plurality of packets that includes receiving the plurality of packets from a network, analyzing each of the plurality of packets by a classifier to determine to which of a plurality of temporary data structures each of the plurality of packet is to be forwarded, forwarding each of the plurality of packets to one of the plurality of temporary data structures as determined by the classifier, forwarding a plurality of packets from the one of the plurality of temporary data structures to a virtual serialization queue associated with the one of the plurality of temporary data structures, wherein the virtual serialization queue is bound to a thread having a processing priority, and processing the plurality of packets on the virtual serialization queue using at least one processor bound to the virtual serialization queue and the processing priority.

18 Claims, 7 Drawing Sheets

METHOD AND APPARATUS FOR ENFORCING PACKET DESTINATION SPECIFIC PRIORITY USING THREADS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112,436; "Network Interface Card Resource Mapping to Virtual Network Interface Cards" Ser. No. 11/112,063; "Network Interface Decryption and Classification Technique" Ser. No. 11/112,436; and "Method and Apparatus for Enforcing Resource Utilization of a Container" Ser. No. 11/112,910; "Method and Apparatus for Processing Network Traffic Associated with Specific Protocols" Ser. No. 11/112,228; "Method and Apparatus for Enforcing Bandwidth Utilization of a Virtual Serialization Queue" Ser. No. 11/112,934.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed to determine the connection associated with the packet.

Typically, the analyses of the packets received by the system includes querying a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the packets have been analyzed and a determination has been made with respect to the connection with which the packets are associated, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. As the packets are all placed in a single FIFO queue, the order in which individual packets are processed is dependent on the order in which the individual packet was placed in the queue. There is typically no ability to control when individual packets are processed (i.e., giving certain packets higher priority for processing).

SUMMARY

In general, in one aspect, the invention relates to a method for processing a plurality of packets that includes receiving the plurality of packets from a network, analyzing each of the plurality of packets by a classifier to determine to which of a plurality of temporary data structures each of the plurality of packet is to be forwarded, forwarding each of the plurality of packets to one of the plurality of temporary data structures as determined by the classifier, forwarding a plurality of packets from the one of the plurality of temporary data structures to a virtual serialization queue associated with the one of the plurality of temporary data structures, wherein the virtual serialization queue is bound to a thread having a processing priority, and processing the plurality of packets on the virtual serialization queue using at least one processor bound to the virtual serialization queue and the processing priority.

In general, in one aspect, the invention relates to a system that includes a network interface configured to receive a plurality of packets from a network, a classifier operatively connected to the network interface configured to analyze each of the plurality of packets and determine to which of a plurality of temporary data structures each of the plurality of packet is forwarded, the plurality of temporary data structures configured to receive packets from the classifier, wherein each of the plurality of temporary data structures is associated with at least one of a plurality of virtual serialization queues, and the plurality of virtual serialization queues each configured to queue a plurality of packets from at least one of the plurality of temporary data structures, wherein each of the plurality of virtual serialization queues is associated with one of a plurality of threads, wherein each of the plurality of threads is associated with a processing priority.

Other aspects of the invention will be apparent from the following description and the appended claims.

DETAILED DESCRIPTION

Figure 1A:
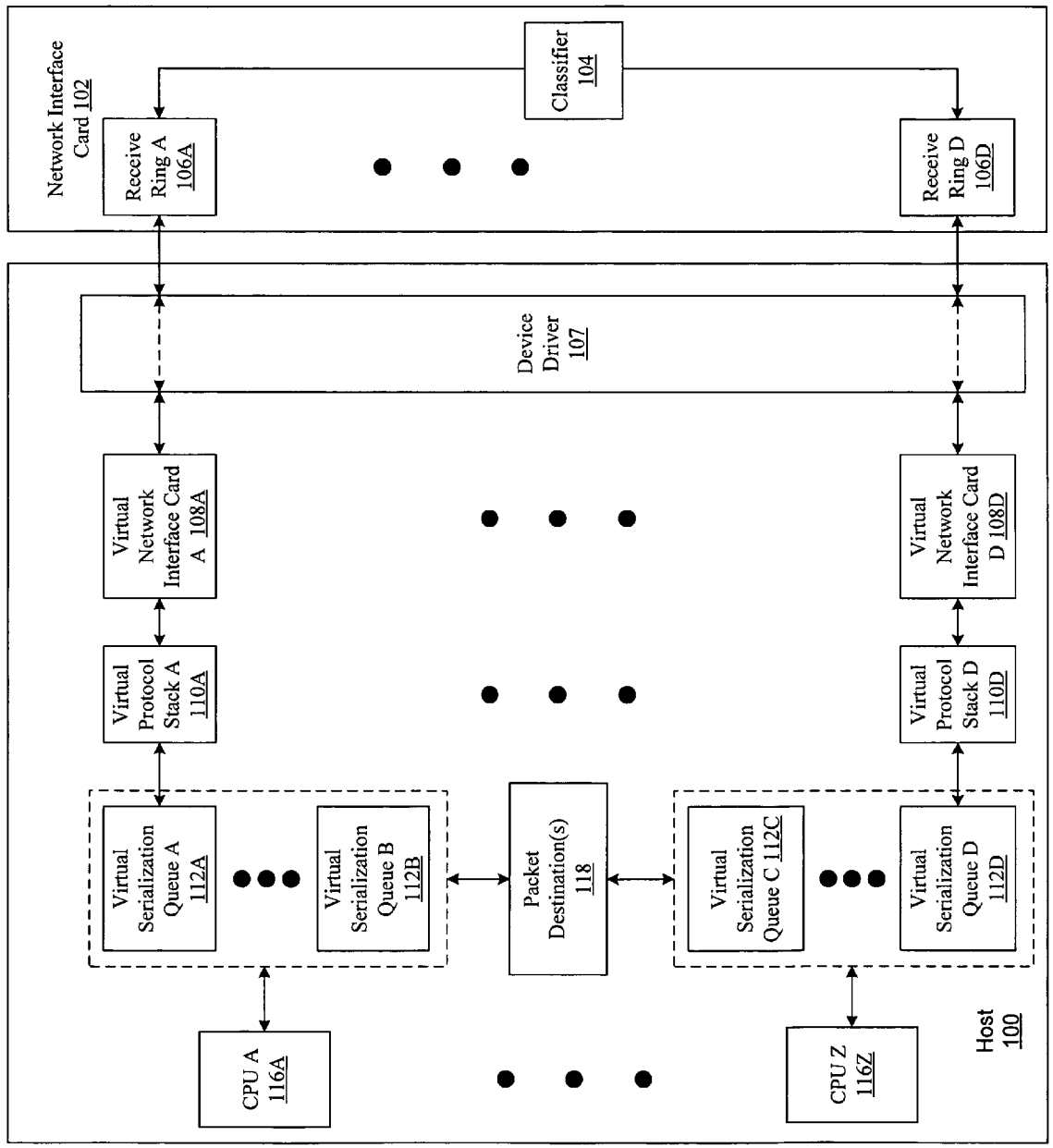
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, the invention relates to a method and apparatus for processing packets. More specifically, embodiments of the invention relate to binding a thread to each virtual serialization queue and then using the processing priority associated with the thread to determine the amount of CPU time allocated to process each of the virtual serialization queues.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destinations (118) (e.g., containers and/or services). In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various packet destinations (118) (e.g., containers and/or services) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc.

Figure 1B:
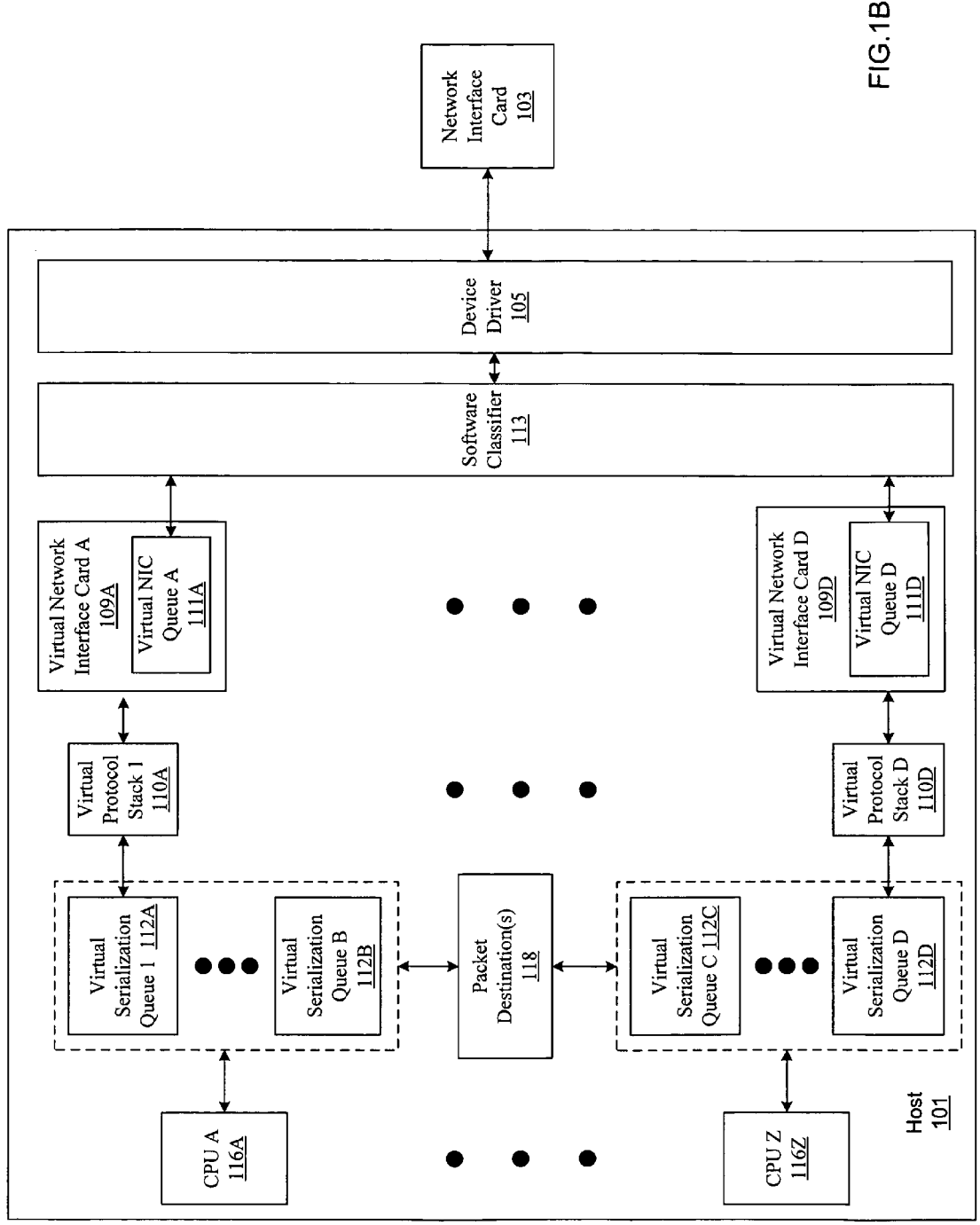

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes a NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one packet destination (118) (e.g., containers and/or services). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destinations (118) (e.g., containers and/or services) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocol types. Thus, while the host (101) may be operatively connected to a single NIC (103), the host (101) (or more specifically, packet destinations (118) (e.g., containers and/or services) (at both the kernel level and the user-level) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (101) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server), etc. In one embodiment of the invention, each packet destination (118) (e.g., containers and/or services) may be associated with one or more virtual serialization queues (112A, 112B, 112C, 112D).

Figure 2:
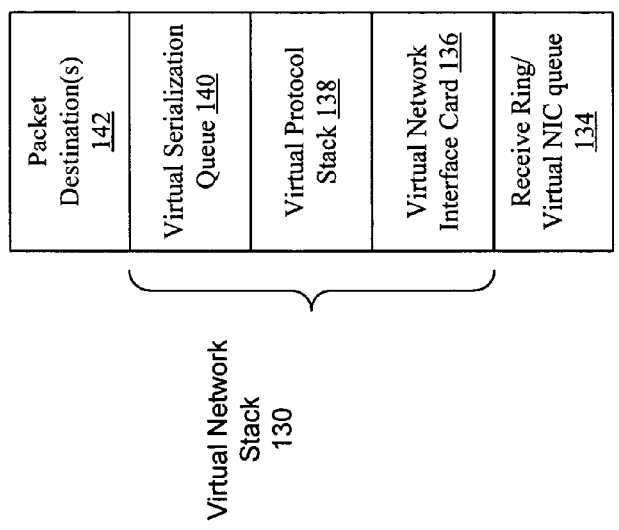
FIG. 2 shows a virtual network stack in accordance with one embodiment of the invention.

In one embodiment of the invention, the receive rings and the virtual NIC queues may be generally referred to as temporary data structures. Further, in one embodiment of the invention, a system, as shown in FIG. 1 and FIG. 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B.

Those skilled in the art will appreciate that while FIG. 1A and FIG. 1B refer to CPUs, any type of processor (i.e., a device which may be configured to process packets) may be used.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140).

In one embodiment of the invention, the virtual network stack (130) may be bound to one or more receive rings or virtual NIC interfaces (134) (depending on the implementation). Further, the virtual network stack (130) may be bound to one or more packet destinations (142) (e.g., containers and/or services). All of the aforementioned components in the virtual network stack (130) are bound together such that a packet received by the virtual NIC (136) of a particular virtual network stack (130) is forwarded through the other components of the virtual network stack (130) until the packet reaches the packet destination (142) (e.g., containers and/or services) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
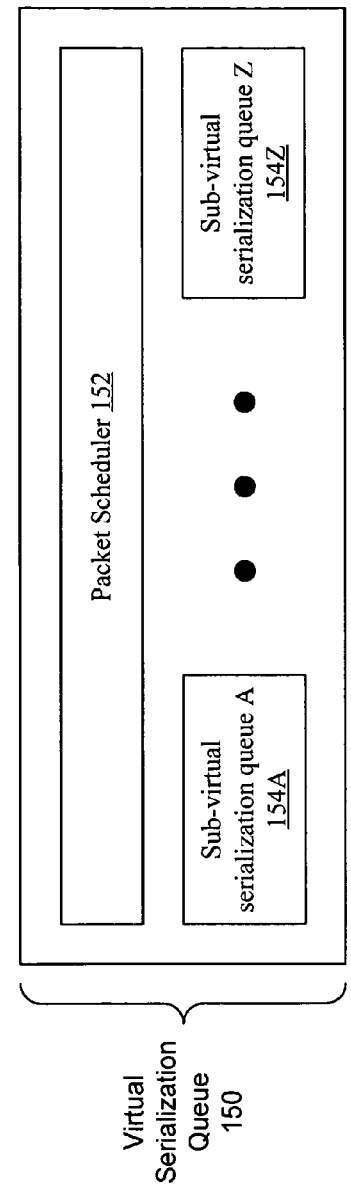
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) are bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
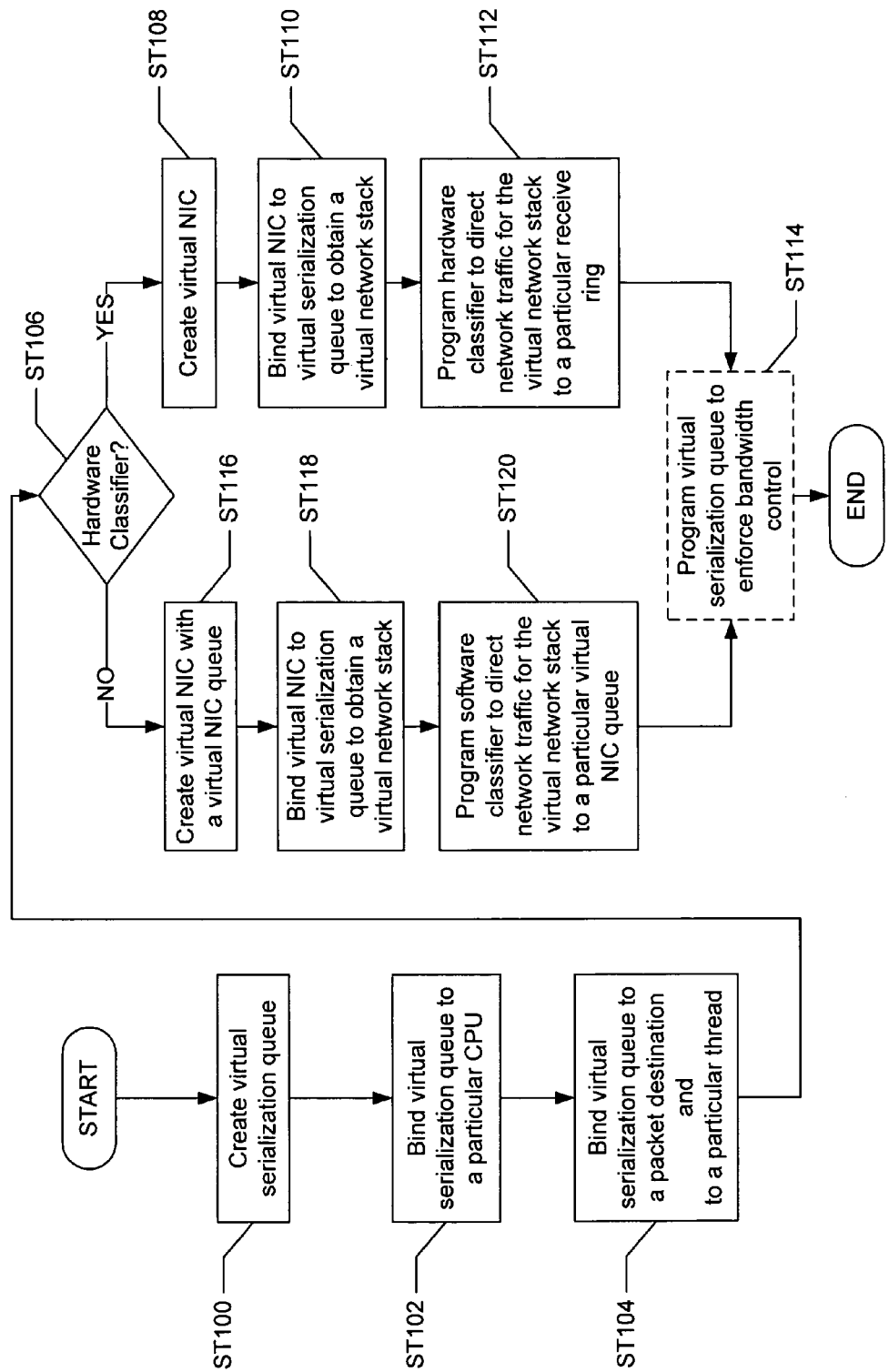
FIG. 4 shows a flowchart in accordance with one embodiment of the invention.

FIG. 4 shows a flowchart in accordance with one embodiment of the invention. Initially, a virtual serialization queue as shown and described in FIG. 1A, FIG. 1B, FIG. 2, and FIG. 3, is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a packet destination (e.g., containers and/or services) and to a thread executing on the host (ST104). Those of ordinary skill in the art will appreciate that the packet destination (118) (e.g., containers and/or services) may be bound to the virtual serialization queue any time after the virtual serialization queue has been created.

In one embodiment of the invention, each virtual serialization queue is bound to a thread. Said another way, there is a unique thread from each virtual serialization queue. Further, in one embodiment of the invention, each thread is associated with a processing priority (e.g., a property that determines the relative order in which the thread uses computing resources (e.g., central processing unit)). For example, if the system includes two threads, one with a high priority and one with a low priority, then the thread with the high priority is processed first and the thread with the low priority will remain idle until such time as the thread with the high priority is finished processing.

In one embodiment of the invention, the aforementioned threads may be one or more kernel threads (i.e., threads created in the context of the kernel) and the kernel may include functionality to assign processing priority to each of the aforementioned threads. Alternatively, the threads may be created in a process context such that the threads inherit the processing priority of the process. In this scenario, the kernel includes functionality to: (i) assign a priority to a process that may be used for scheduling by the CPU (or processor set (i.e., a group of CPUs)); and (ii) create and bind threads to a process. Those skilled in the art will appreciate that other mechanisms may be used to associate a processing priority with a thread. In addition, those skilled in the art will appreciate that the processing priority of any given thread may be dynamically changed at any time after the thread has been created.

In one embodiment of the invention, each of the aforementioned threads is bound to a CPU or to a processor set. In addition, the CPU or processor set schedules the order in which a given virtual serialization queue is processed by comparing the processing priority of the thread associated with the given virtual serialization queue with the processing priority of each of the other threads bound to the CPU or processor set.

Continuing with the discussion of FIG. 4, a determination is subsequently made about whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). The virtual serialization queue created in ST100 is programmed to enforce bandwidth control (ST114). In one embodiment of the invention, ST114 is optional. In one embodiment of the invention, programming the virtual serialization to enforce bandwidth control includes specifying a bandwidth control parameter for the virtual serialization queue. In one embodiment of the invention, the bandwidth control parameter specifies the maximum number of packets that may be processed by the virtual serialization queue over a specific time period (e.g., number of packets that may be processed by the specific virtual serialization queue per second). Alternatively, the bandwidth control parameter may specify the maximum number of bytes of data that may be processed by the virtual serialization queue in a specific time period.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
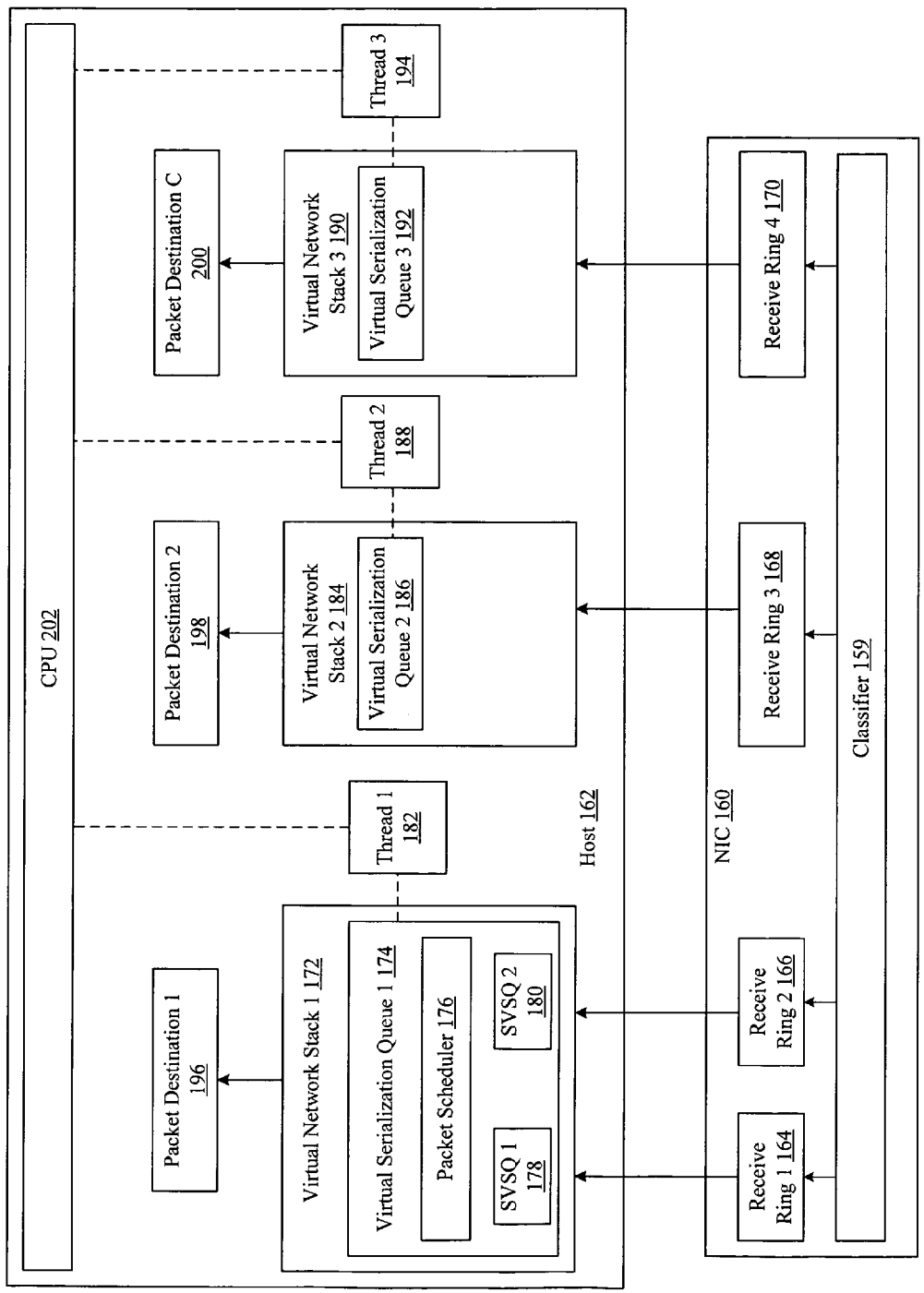
FIG. 5 shows an exemplary system in accordance with one embodiment of the invention.

FIG. 5. shows an exemplary system after the steps in FIG. 4. have been performed in accordance with one embodiment of the invention. The system shown in FIG. 5 includes a NIC (160) operatively connected to a host (162). As shown in FIG. 5, the NIC (160) includes a classifier (160) operatively connected to four receive rings (receive ring 1 (164), receive ring 2 (166), receive ring 3 (168), and receive ring 4 (170)). Thus, the classifier (159) is configured to receive packets, analyze the packets, and forward the packets to the appropriate one of the aforementioned receive rings (164, 166, 168, 170) based on one or more rules used by the classifier (159).

Each of the aforementioned receive rings is bound to a virtual network stack in the host (162). In particular, the receive ring 1 (164) and receive ring 2 (166) are bound virtual network stack 1 (172). Similarly, receive ring 3 (166) is bound to virtual network stack 2 (184) and receive ring 4 (170) is bound to virtual network stack 3 (190). Each of the aforementioned virtual serialization queues is associated with a packet destination. In particular, virtual network stack 1 (172) is associated with packet destination 1 (196), virtual network stack 2 (184) is associated with packet destination 2 (198), and virtual network stack 3 (190) is associated with packet destination 3 (200).

As shown in FIG. 5, each of the aforementioned virtual network stacks (172, 184, 190) includes a virtual serialization queue. Specifically, virtual network stack 1 (172) includes virtual serialization queue 1 (174), virtual network stack 2 (184) includes virtual serialization queue 2 (186), and virtual network stack 3 (190) includes virtual serialization queue 3 (192). In addition, as shown in FIG. 5, virtual serialization queue 1 (174) includes two sub-virtual serialization queues, namely, SVSQ 1 (178) and SVSQ 2 (180). Virtual serialization queue 1 (174) also includes a packet scheduler (176) that determines the order in which packets on SVSQ 1 (178) and SVSQ 2 (180) are processed.

Each of the aforementioned virtual serialization queues (174, 186, and 192) is bound to a thread. In particular, virtual serialization queue 1 (174) is bound to thread 1 (182), virtual serialization queue 2 (186) is bound to thread 2 (188), and virtual serialization queue 3 (192) is bound to thread 3 (194). In addition, each of the aforementioned threads (182, 188, 194) is bound to CPU (202). Further, each of the aforementioned threads (182, 188, 194) is associated with a processing priority. The CPU (202) uses the processing priority assigned to each of the aforementioned threads (182, 188, 194) to determine the order in which to process the packets on the various virtual serialization queues (172, 186, 192).

With respect to the processing of packets in virtual serialization queue 1 (174) and, more specifically, in SVSQ 1 (178) and SVSQ 2 (180), the packet scheduler (176) is configured to determine the order in which packets on SVSQ 1 (178) and SVSQ 2 (180) are to be processed. Thus, the processing priority of thread 1 (182) determines when packets in virtual serialization queue 1 (174) (i.e., packets within SVSQ 1 (178) and SVSQ 2 (180)) are to be processed in relation to packets on the other virtual serialization queues (186, 192) and the packet scheduler (176) determines the order in which the packets within virtual serialization queue 1 (174) are processed.

Those skilled in the art will appreciate that the system shown in FIG. 5 is intended to show various embodiments of the invention and not to limit the scope of the invention.

Figure 6:
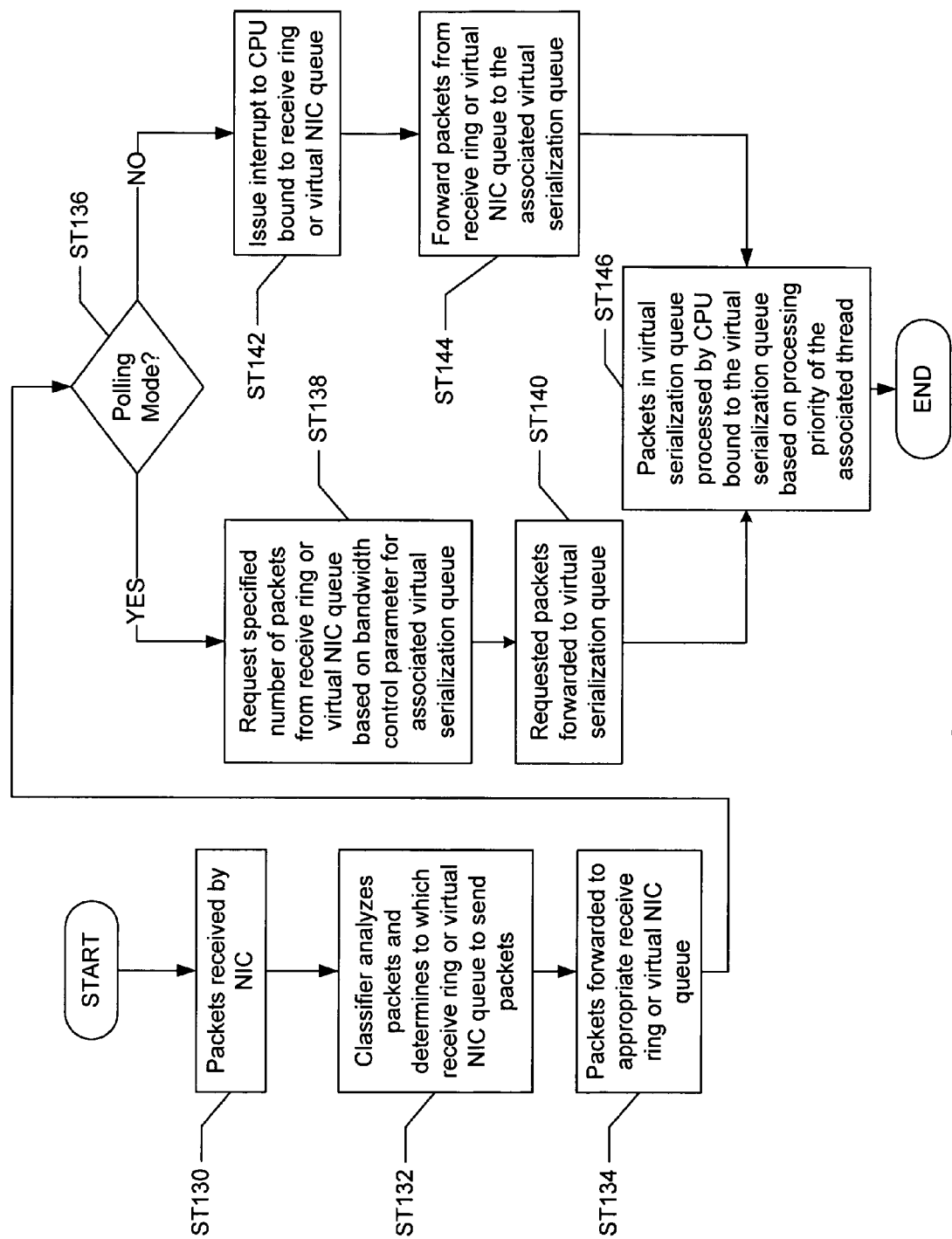
FIG. 6 shows a flowchart in accordance with one embodiment of the invention.

FIG. 6 shows a flowchart in accordance with one embodiment of the invention. Initially, one or more packets are received by the NIC (ST130). A classifier (either a hardware classifier residing in the NIC or a software classifier residing in the host operatively connected to the NIC) analyzes each packet and determines which of the receive rings (if the classifier is a hardware classifier) or virtual NIC queues (if the classifier is a software classifier) to forward each of the packets (ST132). The packets are subsequently forwarded to the appropriate receive ring (if the classifier is a hardware classifier) or virtual NIC queue (if the classifier is a software classifier) as determined by the classifier (ST134). At this stage, the processing of the packets differs depending on which mode the virtual serialization queue (which is bound to the receive ring or virtual NIC queue via the stack) is operating in. Specifically, the processing of the packets depends on whether the virtual serialization queue is operating in polling mode or interrupt mode (ST136).

If the virtual serialization queue is operating in polling mode, then the packets remain in the receive ring or virtual NIC queue (depending on the implementation) until the virtual serialization queue requests a specified number of packets from the receive ring or virtual NIC queue based on the bandwidth control parameter (ST138). The requested number of packets is then forwarded to the virtual serialization queue (ST140). In one embodiment of the invention, the virtual serialization queue does not request any packets when packets are already queued on the virtual serialization queue. Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132.

Those skilled in the art will appreciate the virtual serialization queue may operate in polling mode without using a bandwidth control parameter. Thus, if no bandwidth control parameter is specified, then all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding container or service is requesting packets, the receive rings and/or virtual NIC queues fills with packets and packets received after this point are dropped until packets on the receive rings and/or virtual NIC queues are requested and processed. In an alternate embodiment, a notification may be sent to the sender of the packets to decrease the rate at which packets are sent (i.e., initiate/activate flow control on the sender). In this scenario, if the sender does not include functionality to implement flow control, then the receive rings and/or virtual NIC queues proceed to drop packets in the manner described above.

Alternatively, if the virtual serialization queue is operating in interrupt mode, then an interrupt is issued to the CPU bound to the receive ring or virtual NIC queue (i.e., the CPU bound to the virtual serialization queue that is bound to the stack associated with the receive ring or virtual NIC queue) (ST142). When the interrupt is serviced, all packets in the receive ring or virtual NIC queue are forwarded to the virtual serialization queue (ST144).

Once the packets are placed on the virtual serialization queue, regardless of the mode in which the virtual serialization queue is operating, the packets are processed by the CPU (or processor set) bound to the particular virtual serialization queue based on the processing priority of the thread associated with the virtual serialization queue (ST146). In one embodiment of the invention, the specific order in which the packets in a particular sub-virtual serialization queue are processed is determined by the packet scheduler.

Those skilled in the art will appreciate that the CPU (or processor set) may implement any form of scheduling that uses the processing priority of the threads. In addition, the CPU (or processor set) may implement both pre-emptive (i.e., high priority threads pre-empt currently executing low priority thread) and non-pre-emptive (i.e., low priority threads currently executing are not preempted but subsequently scheduled threads are scheduled based on priority) priority scheduling (i.e., scheduling that uses processing priority of the threads). Further, in one or more embodiment of the invention, the priority scheduling may implement some form of aging. Aging, in the context of priority scheduling, involves increasing the priority of a given thread over time such that the thread, regardless of its initial processing priority, eventually is processed.

In addition to the aforementioned scheduling schemes, the CPU (or processor set) may implement multi-level queue scheduling in which the processing of each queue is scheduled based on fixed priority scheduling (i.e., one queue has a higher priority than another queue) and the processing within each queue uses priority-based scheduling or non-priority based scheduling (e.g., round-robin scheduling, first-come-first serve scheduling, etc.). In this scenario, each thread may be associated with a given queue. Thus, packets in virtual serialization queues associated with threads in a high priority queue are processed before packets in virtual serialization queues associated with low priority threads. Those skilled in the art will appreciate that a given implementation may include any number of queues each having a different priority.

In one embodiment of the invention, the invention may be implement such that a first set of threads, all having the same processing priority, are used to poll the individual receive rings. A second set of threads, all having a processing priority greater than the first set of threads, are associated with the virtual serialization queues. In this implementation, two-level scheduling may be implemented such that the first set of threads is assigned to a first queue having a low amount of CPU (or processor set) resources (e.g., 20%) and the second set of threads is assigned to a second queue having a large amount of CPU (or processor set) resources (e.g., 80%). Further, the first queue implements round-robin scheduling and the second queue implements fixed priority scheduling based on the processing priority of each of the second set of threads. Thus, the CPU (or processor set) resources may use time-share scheduling to allocate 20% of the CPU (or processor set) resources to the first set of threads and 80% of the CPU (or processor set) resources to the second set of threads. Further, when the first set of threads is executing on the CPU (or processor set), the individual threads within the first set are allocated CPU (or processor set) resources using round-robin scheduling. In contrast, when the second set of threads is executing on the CPU (or processor set), the individual threads in the second set are allocated CPU (or processor set) resources based on the relative priority of each of the individual threads in the second set.

Those skilled in the art will appreciate that the above implementation is only an example of one embodiment of the invention and is not intended to limit the scope of the invention.

Figure 7:
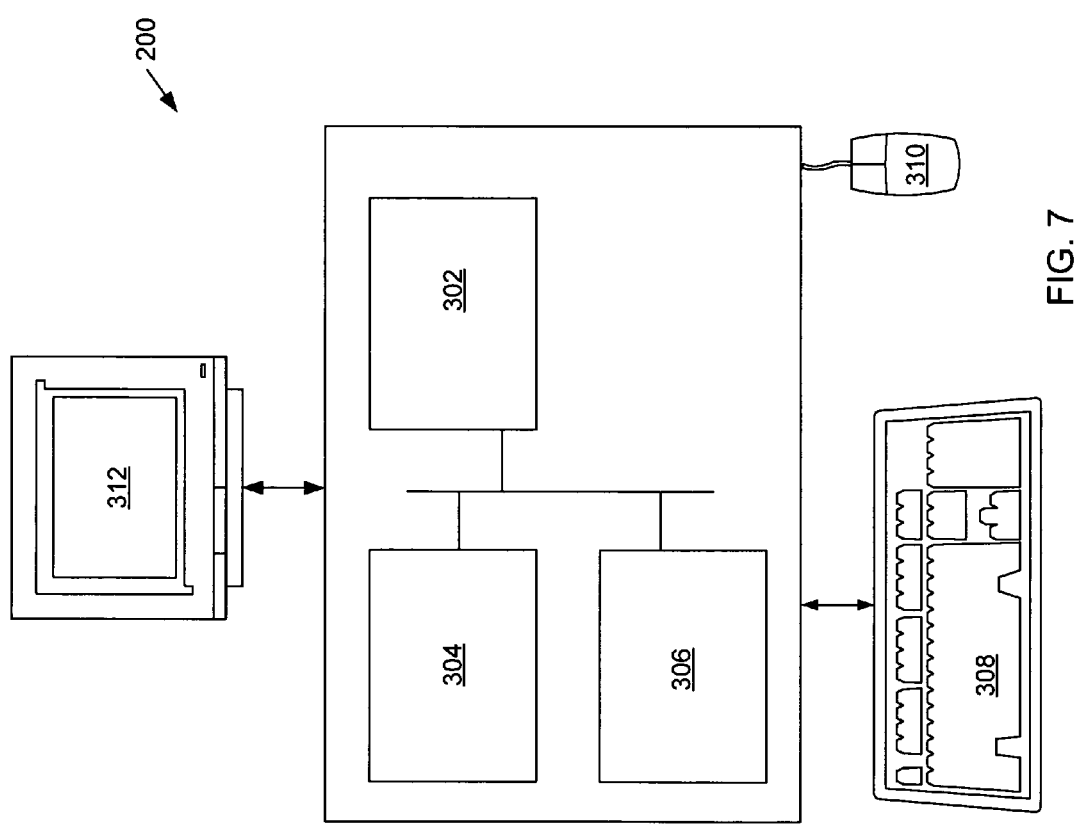
FIG. 7 shows a computer system in accordance with one embodiment of the invention.

An embodiment of the invention may be implemented on virtually any type of computer regardless of the platform being used. For example, as shown in FIG. 7, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a plurality of packets, comprising:
   creating a virtual network stack prior to receiving the plurality of packets from a network wherein a virtual serialization queue is associated with the virtual network stack;
   receiving the plurality of packets from the network;
   analyzing each of the plurality of packets by a classifier to determine to which of a plurality of temporary data structures each of the plurality of packet is to be forwarded;
   forwarding each of the plurality of packets to one of the plurality of temporary data structures as determined by the classifier;
   forwarding a plurality of packets from the one of the plurality of temporary data structures to the virtual serialization queue associated with the one of the plurality of temporary data structures, wherein the virtual serialization queue is bound to a thread having a processing priority; and
   processing the plurality of packets on the virtual serialization queue using at least one processor bound to the virtual serialization queue and the processing priority,
   wherein creating the virtual network stack comprises:
      creating the virtual serialization queue;
      binding the virtual serialization queue to the processor;
      binding the virtual serialization queue to a packet destination;
      binding the virtual serialization queue to the thread;
      creating a virtual network interface card (NIC); and
      binding the virtual serialization queue to the virtual NIC and a virtual protocol stack to obtain the virtual network stack.

2. The method of claim 1, wherein the packet destination is at least one selected from the group consisting of a container and a service.

3. The method of claim 1, further comprising:
   setting the processing priority of the thread prior to receiving the plurality of packets from the network.

4. The method of claim 1, wherein the processing priority of the thread is changed dynamically.

5. The method of claim 1, wherein each of the plurality of temporary data structures comprises at least one selected from the group consisting of a virtual network interface card queue and a receive ring.

6. The method of claim 1, wherein the classifier is one selected from the group consisting of a hardware classifier and a software classifier.

7. The method of claim 1, wherein forwarding the plurality of packets to the virtual serialization queue associated with the packet destination comprises:
   forwarding the plurality of packets from the one of the plurality of temporary data structures to a virtual protocol stack associated with the packet destination for processing of the plurality of packets to obtain processed packets; and
   forwarding the processed packets from the virtual protocol stack to the virtual serialization queue.

8. The method of claim 1, wherein the virtual serialization queue comprises at least one sub-virtual serialization queue and a packet scheduler.

9. The method of claim 1, wherein the packet scheduler uses one selected from the group consisting of fair-share scheduling and time-share scheduling.

10. The method of claim 1, wherein the virtual serialization queue comprises functionality to operate in polling mode and in interrupt mode.

11. The method of claim 1, wherein the at least one processor is a member of a processor set.

12. A system, comprising:
   a network interface configured to receive a plurality of packets from a network;
   a classifier operatively connected to the network interface configured to analyze each of the plurality of packets and determine to which of a plurality of temporary data structures each of the plurality of packet is forwarded;
   the plurality of temporary data structures configured to receive packets from the classifier, wherein each of the plurality of temporary data structures is associated with at least one of a plurality of virtual serialization queues; and
   the plurality of virtual serialization queues each configured to queue a plurality of packets from at least one of the plurality of temporary data structures, wherein each of the plurality of virtual serialization queues is associated with one of a plurality of threads, wherein each of the plurality of threads is associated with a processing priority,
   wherein the virtual serialization queue is bound to a processor,
   wherein at least one of the plurality of virtual serialization queues is bound to one of a plurality of packet destinations,
   wherein the each of the plurality of virtual serialization queues is associated with a virtual network stack, and
   wherein the virtual network stack comprises a virtual network interface card, a virtual protocol stack and one of the plurality of virtual serialization queues.

13. The system of claim 12, wherein the plurality of packets on each of the plurality of virtual serialization queues are processed based on the processing priority of each of the plurality threads associated with each of the plurality of virtual serialization queues.

14. The system of claim 12, wherein processing priority of each of the plurality of threads is changed dynamically.

15. The system of claim 12, wherein each of the plurality of packet destinations is at least one selected from the group consisting of a container and a service.

16. The system of claim 12, wherein each of the plurality of temporary data structures comprises at least one selected from the group consisting of a virtual network interface card queue and a receive ring.

17. The system of claim 12, wherein the classifier is one selected from the group consisting of a hardware classifier and a software classifier.

18. The system of claim 12, wherein each of the plurality of virtual serialization queues comprises functionality to operate in polling mode and in interrupt mode.

* * * * *